Jan. 27, 1942.   L. L. CUNNINGHAM   2,271,453
LOAD COMPENSATING TEMPERATURE CONTROL SYSTEM
Original Filed May 27, 1933
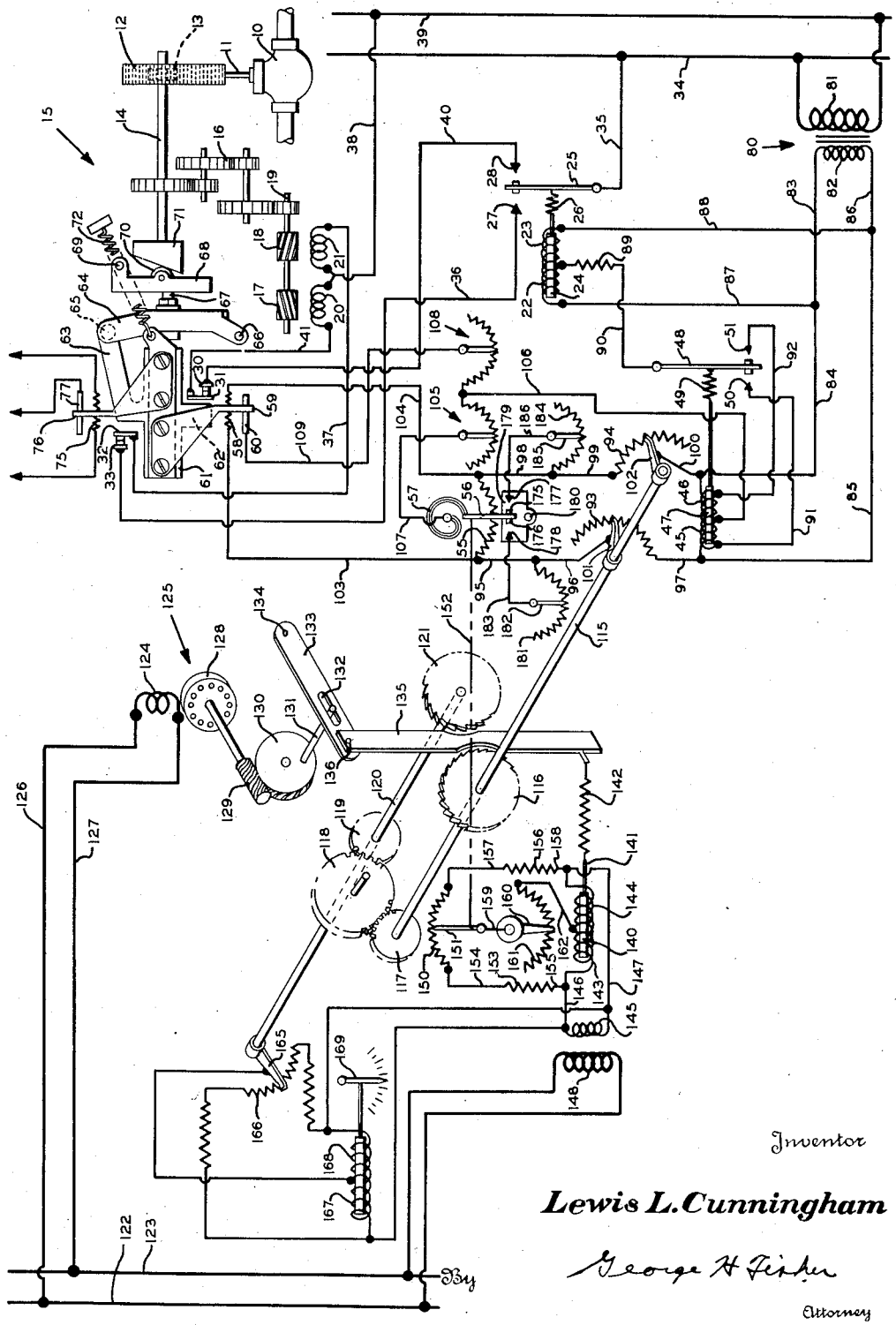
Inventor
*Lewis L. Cunningham*
By George H. Fisher
Attorney Patented Jan. 27, 1942

2,271,453

UNITED STATES PATENT OFFICE 2,271,453

LOAD COMPENSATING TEMPERATURE CONTROL SYSTEM

Lewis L. Cunningham, Minneapolis, Minn., assignor to Minneapolis-Honeywell Regulator Company, Minneapolis, Minn., a corporation of Delaware Original application May 27, 1933, Serial No. 673,236. Divided and this application July 19, 1935, Serial No. 32,221

38 Claims. (Cl. 236—74)

The present invention relates to temperature control systems in general and particularly to industrial heating systems.

In the practical control of a heating system, for instance, it has sometimes been found that the positioning of a heat control instrumentality in accordance with the temperature and/or pressure condition to be controlled permits of undesirably large fluctuations from normal of the temperature and/or pressure condition if the demand or load on the heating system varies in a substantial amount. Under these conditions, it is desirable primarily to position the heat control instrumentality in accordance with the position of a movable member responding to the temperature and/or pressure condition and also to change the position of the heat control instrumentality as a result in changes in load, such as positioning it in accordance with the deviation of the movable member from its normal position and/or in accordance with the length of time that such deviation persists.

An object of this invention, therefore, is the positioning of a control instrumentality primarily in accordance with the position of a condition responsive movable member and also in accordance with the deviation of that, or another, movable member from its normal desired position and/or in accordance with the length of time that such abnormal deviation persists.

It is also often desirable additionally to change the position of the heat control instrumentality in respect to the position of a condition responsive movable member upon initial reverse movement of the movable member. In other words, upon initial reverse movement of the movable member, the heat control instrumentality is given an initial movement in a direction to check or counteract the change which caused such reverse movement of the movable member. This initial change in position of the heat control instrumentality is in addition to the usual movements resulting from any movement of the movable member and may also be in addition to the corrective movements applied as a result of a deviation of the movable member from its desired normal position in accordance with the amount of such deviation and/or in accordance with the length of time such deviation persists.

An additional object of the invention is the positioning of a control instrumentality primarily in accordance with the position of a movable member and also as a result of initial reverse movements of the movable member.

Another object of the invention is the positioning of a control instrumentality primarily in accordance with the position of a movable member and also in accordance with the deviation of that, or another, movable member from its normal desired position and/or in accordance with the length of time that such abnormal deviation persists and, in addition, to adjust the position of the control instrumentality upon initial reverse movement of the movable member.

More specifically, the invention has for an object, the provision of a system in which a normally balanced electrically controlled means is unbalanced by the movement of a movable member from its normal desired position and is additionally unbalanced in proportion to the amount of deviation of the movable member from its normal desired position and/or in accordance with the length of time such deviation persists and/or as a result of initial reverse movements of the movable member. The system is such that the unbalancing of the normally balanced electrically controlled means or balanced solenoid operates a switching mechanism in control of an electrically controlled device which positions a control instrumentality in accordance with the degree of unbalancing of the electrically controlled means and also electrically rebalances said means.

Further objects of the invention will be found in the drawing illustrating the same, the detailed description and the claims.

For a more complete understanding of the invention, reference may be had to the following detailed description and the single accompanying drawing which is a diagrammatic showing of one form of my invention.

This application is a division of my copending application Serial No. 673,236, filed May 27, 1933 now Patent No. 2,160,400, dated May 30, 1939 entitled "Remote control systems."

Referring to the single drawing, a temperature controlling device is herein shown in the form of a valve 10 which has its stem 11 connected to a rack 12. The rack 12 is engaged by a pinion 13 which is in turn secured to the main shaft 14 of a motor mechanism generally indicated at 15. This main shaft 14 is connected to a suitable reversible motor means through reduction gearing indicated at 16. The reversible motor means is herein shown as comprising a pair of rotors 17 and 18 that are secured to a common rotor shaft 19, field windings 20 and 21 being associated with the respective rotors 17 and 18. It will be understood that any other suitable type of reversible motor means could be utilized.

The field windings 20 and 21 are primarily controlled by a balanced relay which comprises a pair of relay windings 22 and 23. These may either be separate windings or a center-tapped winding. These two-windings 22 and 23 control a single plunger or armature 24 which is connected to a relay switch arm 25 through a non-magnetic resilient connection, such as the spring 26. The switch arm 25 cooperates with a pair of spaced contacts 27 and 28 between which it is disposed.

The field windings 20 and 21 are additionally controlled by a pair of limit switches, the first comprising switch arms 30 and 31 and the second comprising switch arms 32 and 33.

Upon movement of relay switch arm 25 into engagement with contact 27, field winding 21 is energized as follows: line wire 34, wire 35, relay switch arm 25, contact 27, wire 36, limit switch arms 33 and 32, wire 37, field winding 21 and wire 38 to line wire 39. Similarly, engagement of relay switch arm 25 with contact 28 causes energization of field winding 20 by a circuit as follows: line wire 34, wire 35, relay switch arm 25, contact 28, wire 40, limit switch arms 30 and 31, wire 41, field winding 20 and wire 38 to line wire 39.

The respective energizations of relay windings 22 and 23 are controlled by a balanced solenoid mechanism which includes a pair of solenoid coils 45 and 46 that may well be formed by providing a single solenoid coil with a center-tap. These solenoid coils 45 and 46 control a single plunger or armature 47 which is connected to a switch arm 48 through a non-magnetic connection, such as the spring 49. The switch arm 48 cooperates with a pair of spaced contacts 50 and 51 and is disposed between the same.

The respective energizations of solenoid coils 45 and 46 are controlled, in part, by a controlling potentiometer which includes a control resistance 55 and a cooperating control contact arm or movable member 56. This movable member 56 may be controlled in any manner, either automatically or manually, and is herein shown as controlled by a temperature responsive element in the form of a bimetallic coil 57.

The energizations of solenoid coils 45 and 46 are further controlled by a balancing potentiometer which comprises a balancing resistance 58 and a cooperating balancing contact arm 59 which additionally engages a contact plate 60.

This balancing potentiometer and the two heretofore described limit switches are all controlled by a mechanism which will now be described. This mechanism includes a piece of insulating material 61 or actuator to which the balancing contact arm 59 is secured. This piece of insulating material 61 is provided with an outwardly extending finger 62 which is adapted to engage the switch arm 30 and move the same from engagement with the switch arm 31. The piece of insulating material 61 is further provided with an extension or finger 63, a portion of which is adapted to engage the limit switch arm 33 and move the same from engagement with limit switch arm 32, there being a lever 64 pivotally connected to the end of finger 63 as indicated at 65. This lever 64 is pivoted to a suitable support at 66 and supports an adjustable abutment indicated at 67. A second lever 68, which is pivoted at 69, is arranged to engage the abutment 67. This lever 68 supports a roller 70 which engages a cam 71 that is secured to the main shaft 14 of the motor mechanism 15. A coiled spring 72 biases the actuator 61 to the right so that the abutment 67 is held against the lever 68 and the roller 70 in turn is held against the cam 71. It will be evident that upon clockwise movement of main shaft 14, as viewed from the left, the spring 72 will pull the actuator 61 towards the right. Similarly, upon counter-clockwise rotation of the main shaft 14, as viewed from the left, the cam 71 will move the actuator 61 towards the left against the action of spring 72. If desired, this motor mechanism 15 may operate a second potentiometer which may be utilized as the controlling potentiometer for another similar motor mechanism. This second potentiometer comprises a controlling resistance 75, a controlling contact arm 76, and a contact plate 77.

Low voltage power is supplied to the solenoid coils 45 and 46 and to the relay windings 22 and 23, as well as to the associated controlling and balancing potentiometers, by a step-down transformer 80 having a high voltage primary 81, that is connected to the line wires 34 and 39, and a low voltage secondary 82. The solenoid coils 45 and 46, in series, are connected across this secondary 82 by means of wires 83, 84, 85 and 86. Similarly, the relay windings 22 and 23, in series, are connected across the secondary 82 by means of wires 83, 87, 88 and 86. The junction of relay windings 22 and 23 is connected to the switch arm 48, through a protective resistance 89, by means of a wire 90. The contact 50 is connected to a small number of turns of the solenoid coil 45 by means of a wire 91 and the contact 51 is connected to a small number of turns of the solenoid coil 46 by a wire 92. The control resistance 55 is connected in parallel with the series connected solenoid coils 45 and 46, through resistances 93 and 94, by wires 95, 96, 97, 98, 99 and 100. The wires 96 and 100, instead of being directly connected to the respective resistances 93 and 94, are connected to contact arms 101 and 102 which respectively engage the resistances 93 and 94 for a purpose that will be hereinafter set forth. The balancing resistance 58 is connected in parallel with the controlling resistance 55 by means of wires 103 and 104. The junction of solenoid coils 45 and 46 is connected to the bimetallic element 57, and therefore to the control contact arm 56, through a manually operable rheostat 105 by means of wires 106 and 107. Similarly, the junction of solenoid coils 45 and 46 is connected to the contact plate 60, through a rheostat 108, by means of wires 106 and 109.

Assuming that the valve 10 is in the fuel line of a furnace and that bimetallic element 57 responds to the furnace temperature, the valve 10 will be moved to positions corresponding to the temperature of bimetallic element 57 in the manner set forth in my copending application Serial No. 673,236 of which this application is a division. With the parts in the position shown, the valve 10 is substantially half open and the furnace temperature is at the desired point. If the furnace is operating under a small load, the temperature thereof will rise with the result that bimetallic element 57 will move movable member 56 along control resistance 55 toward the left hand end thereof which action will partially close the valve 10 controlled by shaft 14 until a balance is reached wherein the heat input maintains the furnace at an even temperature. This temperature, however, is somewhat higher than that desired as evidenced by movement of movable member 56 to the left of its center position. The furnace temperature can be maintained fairly close to the desired point by making the over-all length of control resistance 55 correspond to a relatively small temperature differential in the furnace. However, if the over-all length of control resistance 55 is made to correspond to a very small furnace temperature differential in an attempt to maintain the furnace temperature within very narrow limits, such as are sometimes required in commercial processes, there may be a resultant hunting of the valve 10 and the system may no longer properly modulate or proportion the position of the valve 10. As a result, when it is desired to control the furnace temperature differential within very narrow limits under varying load conditions, it is desirable to provide additional mechanism whereby the position of the valve 10 and shaft 14 may be adjusted automatically in accordance with the departure of the furnace temperature from normal and/or in accordance with the length of time that such a departure persists and/or upon initial reverse changes in furnace temperature. The additional mechanism which will now be described makes this automatic adjustment possible.

The contact fingers 101 and 102 are secured to shaft 115. The shaft 115 carries a ratchet wheel 116 and a pinion 117. Pinion 117 meshes with an idler gear 118 which in turn meshes with a second pinion 119 mounted upon a shaft 120. Shaft 120 carries a second ratchet wheel 121. Line wires 122 and 123 constantly energize the field winding 124 of a timing motor generally indicated at 125, wires 126 and 127 connecting line wires 122 and 123 to the opposite ends of field winding 124. The rotor 128 of the timing motor 125 drives a reduction gearing herein shown as a worm 129 and a worm wheel 130. A crank pin 131 is carried by worm wheel 130 and the free end of this crank pin 131 extends into a sot 132 which is formed in a lever 133, one end of which is pivoted as shown at 134. A vertical actuator 135 has one of its ends pivoted to the free end of the lever 133 as shown at 136. The actuator 135 is constantly reciprocated vertically by the timing motor 125 and associated mechanism at the rate of about once every two minutes and when the actuator 135 is positioned substantially vertically, it reciprocates freely without engaging either of the ratchet wheels 116 or 121. If the lower free end of actuator 135 is moved to the left, it engages the teeth of ratchet wheel 116 upon upward movement so as to rotate shaft 115 and shaft 120 through pinions 117 and 119 and idler gear 118, in a counterclockwise direction as viewed from the right. Likewise, if the lower end of actuator 135 is moved to the right, it engages the teeth of ratchet wheel 121 during its upward movements and rotates shafts 120 and 115 in a clockwise direction.

The position of actuator 135 is controlled by a plunger 140 to which it is connected by a link 141 and a spring 142. The plunger 140 is controlled by a pair of solenoid coils 143 and 144 which have adjacent ends interconnected and their free ends connected to the secondary 145 of a transformer by wires 146 and 147. The primary 148 of the transformer is constantly energized by the line wires 122 and 123. A compensator control potentiometer comprises a resistor 150 and a movable member 151. The movable member 151 is shown as connected to bimetallic element 57 by a connection 152. One end of the corrector resistance 150 is connected to wire 146 and solenoid winding 143, through a protective resistance 153, by means of wires 154 and 155. The other end of corrector resistance 150 is connected to wire 147 and solenoid winding 144, through a protective resistance 156, by wires 157 and 158. Movable member 151 is connected by a wire 159 to a manualy operable contact finger 160 which may be moved across a resistance 161, one end of which is connected to the junction of solenoid windings 143 and 144 by a wire 162. Contact finger 160 and resistance 161 comprise the sensitivity control for the corrective mechanism and its function will be described under the heading "Operation."

The shaft 120 may control a corrector indicating potentiometer comprising a movable contact finger 165 and resistance 166 which control solenoid windings 167 and 168 that in turn position an indicating needle 169. The solenoid windings 167 and 168 and the corrector indicating potentiometer are connected together through suitable protective resistances and are also connected to the secondary 145 in the manner previously set forth in respect to similar arrangements.

The movable member 56 not only engages control resistance 55 but also extends therebelow and carries a pair of contacts 175 and 176 which are adapted, upon reverse movements of movable member 56, to respectively engage contacts 177 and 178. Contacts 177 and 178 are carried by a plate 179 which is herein shown, for convenience of illustration, as being pivoted at a point indicated at 180. The pivotal mounting of plate 179 comprises any well known type of frictional arrangement whereby the plate 179 remains in any position to which it is moved. In actual practise, the plate 179 is pivoted concentrically with the center of movement of the movable member 56 in order that contacts 175, 176, 177, and 178 will retain their proper alignment.

A first rheostat comprises a resistance 181 and a manually adjustable contact finger 182. One end of resistance 181 is connected to the junction of wires 95 and 96. The contact finger 182 is connected to contact 178 by a wire 183. A similar rheostat comprises a resistance 184 and manually adjustable contact finger 185. The resistance 184 is connected to the junction of wires 98 and 99. The contact finger 185 is connected to contact 177 by a wire 186.

*Operation*

With the parts in the position shown, the valve 10 controlled by shaft 14 is, for instance, in half-open position, the temperature of the furnace is at the desired point with the result that movable member 56 is contacting the central portion of control resistance 55, contacts 175 and 176 are out of engagement with contacts 177 and 178 respectively and the movable member 151 is contacting the center portion of corrector resistance 150. Field windings 20 and 21 are therefore both de-energized and the actuator 135 is in a vertical position wherein it is reciprocated by timing motor 125 without engaging either of the ratchet wheels 116 and 121.

If the temperature of the furnace should rise, bimetallic element 57 will move movable member 56 along control resistance 55 bringing contact 176 into engagement with contact 178. Engagement of contacts 176 and 178 places the effective portion of resistance 181 in parallel with the left hand portion of control resistance 55, thereby decreasing the voltage drop across solenoid coil 45 a predetermined amount which is dependent upon the adjustment of contact finger 182. The changed position of movable member 56 on control resistance 55 likewise lowers the voltage drop across solenoid coil 45. The voltage drop across solenoid coil 46 is increased and the resulting unequal energization of solenoid coils 45 and 46 causes plunger 47 to move to the right with the result that switch arm 48 engages contact 51 to place the small number of turns of solenoid coil 46 and the resistance 89 in parallel with relay winding 22 whereupon plunger 24 moves to the right and energizes field winding 20. Shaft 14 thereupon is rotated clockwise as viewed from the left. Such rotation of shaft 14 begins to close the valve 10 controlled thereby and begins to move balancing contact arm 59 to the right along balancing resistance 58 and contact plate 60. Balancing contact arm 59 must not only move along balancing resistance 58 enough to balance the effect of the new position of movable member 56 on control resistance 55 but must also move an extra amount sufficient to overcome the unbalancing resulting from the engagement of contacts 176 and 178. In this manner, the initial movement of movable member 56 to the left results in an initial relatively large adjustment of the valve 10 in addition to that adjustment resulting from the movement of the movable member to a new position on its control resistance.

This movement of bimetallic element 57 has also moved movable member 151 to the left along resistance 150 whereupon the voltage drop across solenoid winding 144 is made greater than the voltage drop across solenoid winding 143 and plunger 140 moves to the right. This action moves the lower free end of actuator 135 to the right and when actuator 135 is next raised by timing motor 125 and the associated mechanism, ratchet wheel 121 is moved in a clockwise direction as viewed from the right. Shaft 115 is therefore likewise rotated in a clockwise direction with the result that the resistance of the circuit comprising wire 97, resistance 93, contact finger 101, and wire 96 is decreased and the resistance of the circuit comprising wire 99, resistance 94, contact finger 102, and wire 100 is increased. This change in resistances of these circuits again unequalizes the voltage drops across solenoid coils 45 and 46 whereby solenoid coil 46 is again energized to a greater degree than solenoid coil 45. Plunger 47 therefore again moves to the right and this results in a further energization of field winding 20 whereupon shaft 14 again rotates in clockwise direction as viewed from the left. This action closes the valve 10 to a greater degree and likewise moves balancing contact arm 59 closer to the right hand end of balancing resistance 58 to again rebalance the voltage drops across solenoid coils 45 and 46 whereupon field winding 20 is again deenergized.

The shaft 115 will be intermittently rotated in a clockwise direction each time the actuator 135 is raised until the furnace temperature has returned to normal and movable member 151 is brought back to the position shown in the drawing. The angular rotation of shaft 115 each time actuator 135 is raised depends upon the amount of displacement of the lower free end of actuator 135 away from vertical and toward the right which in turn is dependent upon the deviation of the furnace temperature from normal as indicated by the position of movable member 151. The corrective movements of the valve 10 toward closed position are therefore made in accordance with the departure of the furnace temperature from normal, and in accordance with the length of time such departure persists. The time factor is by virtue of the timing motor 125 which reciprocates actuator 135 preferably at the rate of a complete up and down movement every two minutes.

Continued rise in furnace temperature resulting in further movement of movable member 56 along control resistance 55 rotates plate 179 about its pivot 180. Such further movement also again unbalances the voltage drops across solenoid coils 45 and 46 resulting in further closing of the valve 10. Continued rise in furnace temperature also moves movable member 151 further along corrector resistance 150 whereby the voltage drop across solenoid coil 144 is further increased and the voltage drop across solenoid coil 143 is further decreased. Plunger 140 therefore moves further towards the right and each subsequent upward movement of actuator 135 will rotate shaft 115 in a clockwise direction a larger amount than formerly, whereby increased amounts of correction will be applied to the system.

The various closing movements thus supplied to the valve 10 will check the rise in furnace temperature but as long as the furnace temperature remains away from the normal desired value, further corrective movements will be applied. Finally the furnace temperature will begin to lower. Initial lowering of the furnace temperature will cause movable member 56 to disengage contact 176 from contact 178 thereby removing the resistance 181 from its parallel relationship with the left-hand portion of the control resistance 55. The voltage drop across solenoid coil 45 will thereupon be increased and the voltage drop across solenoid coil 46 will be similarly decreased. As a result, switch arm 48 engages contact 50 whereupon the small number of turns of solenoid coil 45 and the resistance 89 are placed in parallel with relay winding 23 and plunger 24 moves to the left and brings relay switch arm 25 into engagement with contact 27 thereby energizing field winding 21. Shaft 14 is thereupon rotated in counter-clockwise direction, as viewed from the left, and valve 10 is moved in an opening direction. Balancing contact arm 59 is moved along balancing resistance 58 toward the left hand end thereof to rebalance the voltage drops across solenoid coils 45 and 46. In this manner, separation of contacts 176 and 178 causes an initial small opening movement of valve 10. Also, part of this movement is the result of movement of movable member 56 along control resistance 55.

A slight further movement of control member 56 to the right in response to a further drop in furnace temperature will cause contact 175 to engage contact 177, whereby resistance 184 is placed in parallel with the right hand portion of control resistance 55 which again increases the voltage drop across solenoid coil 45 and decreases the voltage drop across solenoid coil 46, resulting in a further opening of the valve 10. In this manner, a small fall in furnace temperature results in an initial relatively large opening movement of the valve.

If the furnace temperature continues to fall until the desired normal is reached, the voltage drops across solenoid coils 143 and 144 will be rebalanced and the actuator 135 returned to its vertical position wherein it does not engage either of the ratchet wheels 116 or 121 and further corrective movements due to a departure from normal will no longer be applied.

The movement of control member 56 to the right along control resistance 55 also increases the voltage drop across solenoid coil 45 and decreases the voltage drop across solenoid coil 46 to open the valve an amount corresponding to the movement of the movable member 56.

If the furnace temperature falls below the desired normal, movable member 151 will be moved to the right of the center of corrector resistance 150 resulting in a greater voltage drop across solenoid coil 143 than across solenoid coil 144 and actuator 135 will be moved to the left of its vertical position. Actuator 135 will thereafter engage the teeth of ratchet wheel 116 upon each of its upward movements and shaft 115 will thereupon be rotated in a counter-clockwise direction, when looking from the right, to intermittently increase the effective amount of resistance 94 and decrease the effective amount of resistance 93. Thus the valve 10 is given intermittent opening movements in an effort to restore the furnace temperature to normal as long as it remains below normal.

Whenever the furnace temperature becomes normal so that movable member 56 again contacts the center of control resistance 55 and the movable member 151 contacts the center of corrector resistance 150, all further corrective movements of the valve 10 will cease. However, the valve is not necessarily in its mid position since it may be displaced therefrom in either direction, depending upon the position which contact fingers 101 and 102 are left in respect to their respective resistances 93 and 94 and also depending on whether or not either of contacts 175 or 176 is in engagement with its respective contact 177 or 178. Such new position of the valve should exactly balance the new load condition imposed on the furnace.

From the foregoing description of the operation of the apparatus of this invention, it will be apparent that this invention provides for the positioning of an instrumentality to be controlled in accordance with four different factors. First, the instrumentality is primarily positioned in accordance with the movements of a movable member. Second, the instrumentality is given a quick initial movement whenever the movement of the movable member reverses. Third, the instrumentality is positioned in accordance with the degree of departure of the movable member from its desired normal position. And fourth, the instrumentality is positioned in accordance with the length of time such departure persists.

As previously stated, in this specific embodiment of the invention, a speed of two minutes has been found suitable for a complete revolution of crank pin 131 but it will be appreciated that other speeds may be more desirable under varying conditions of operation and when the apparatus is applied to different processes.

In the description of the operation of this system, the various movement of the valve 10 as the result of movement of the movable members 56 and 151 have been segregated and separately explained for reasons of clarifying the explanation, but in actual operation these movements will all overlap and occur simultaneously to a great extent.

This system includes several adjustments by reason of which the apparatus may be easily adapted to control any one of a number of different devices. If the rheostat 105 is adjusted to include less of its resistance in the circuit, then a smaller movement of movable member 56 along control resistance 55 will be required to unbalance the voltage drops across solenoid coils 45 and 46 sufficiently to move the switch arm 48 into engagement with its associated contacts 50 and 51. In this manner, a smaller temperature change is necessary to obtain a given movement of the instrumentality to be controlled. Adjustment of the rheostat 105 in a direction to include more of its resistance in the circuit decreases the sensitivity of the system. In a like manner, adjustment of the rheostat 106 in a manner to include less of its resistance in the circuit causes the voltage drops across solenoid coils 45 and 46 to be rebalanced upon a smaller movement of balancing contact arm 59 along balancing resistance 58. In this manner, a smaller movement of the instrumentality to be controlled will result upon a given movement of movable member 56. Likewise, larger movements of the instrumentality to be controlled will result for a given movement of movable member 56 if the rheostat 106 is adjusted in an opposite manner. By means of these two adjustments, the response of the system of this invention may be varied as desired or necessary in order to obtain the desired control. These two adjustments are equally applicable to the system even if the other corrective features are omitted.

Rotation of contact finger 160 in a clockwise direction places more of resistance 161 in circuit with the corrector potentiometer and solenoid coils 143 and 144 with the result that the movement of plunger 140 will be decreased for a given movement of movable member 151. Counter-clockwise rotation of contact finger 160 will similarly decrease the amount of movement of movable member 151 required to move plunger 140 a given amount. Adjustment of contact finger 160 therefore determines the amount that actuator 135 will be displaced from vertical upon a given deviation of the furnace temperature from normal with the result that the amount of corrective adjustment applied to the system in a predetermined time for a predetermined variation from normal may be varied as desired.

Adjustment of contact fingers 182 and 185 along their respective resistances 181 and 184 determines the amount of resistance placed in and out of circuit with the left and right hand portions of control resistance 55 upon making and breaking of contacts 176 and 178 and 175 and 177, respectively, whereby the magnitude of the initial adjustment given to the instrumentality to be controlled upon reverse movements of movable member 56 may be varied at will.

While the invention has been specifically described as controlling the flow of fuel to a furnace which it is desired to maintain at a constant temperature under various load conditions, it will be appreciated that such a system has a great degree of utility in many other fields and that many modifications in the detailed arrangement illustrated and described may be made without departing from the spirit of the invention, wherefore the invention is to be limited only by the scope of the appended claims.

I claim as my invention:

1. In combination, an electrically operated device to be positioned in a plurality of positions for controlling the value of a condition, electrical control means for the device including follow-up means operated in response to movement of the device and means responsive to the value of the condition to be controlled for graduatingly positioning said device in accordance with the value of the condition to be controlled to maintain the condition within certain limits, and means operative as an incident to deviation of the condition to be controlled from the desired normal value and responsive to the amount of such deviation additionally to position the device at a rate corresponding to the amount of deviation for returning the value of the condition to be controlled toward the desired normal value.

2. In combination, an electrically operated device to be positioned in a plurality of positions for controlling the value of a condition, electrical control means for the device including follow-up means operated in response to movement of the device and means responsive to the value of the condition to be controlled for graduatingly positioning said device in accordance with the value of the condition to be controlled to maintain the condition within certain limits, and means operative as an incident to deviation of the condition to be controlled from the desired normal value and responsive to the duration of time such deviation exists additionally to position the device an amount corresponding to the duration of time the deviation exists for returning the value of the condition to be controlled toward the desired normal value.

3. In combination, an electrically operated device to be positioned in a plurality of positions for controlling the value of a condition, electrical control means for the device including follow-up means operated in response to movement of the device and means responsive to the value of the condition to be controlled for graduatingly positioning said device in accordance with the value of the condition to be controlled to maintain the condition within certain limits, and means operative as an incident to deviation of the condition to be controlled from the desired normal value and responsive to the amount of such deviation and the duration of time such deviation exists additionally to position the device an amount and at a rate corresponding to the amount of deviation and the duration of time the deviation exists for returning the value of the condition toward the desired normal value.

4. In combination, an electrically controlled device to be positioned in a plurality of positions for controlling the value of a condition, control impedance means adjusted in accordance with changes in the value of the condition to be controlled and having a desired adjustment corresponding to a desired normal value of the condition, mechanism, including follow-up means operated in response to operation of the device, controlled by the adjustment of the control impedance means for graduatingly positioning the device in accordance with the adjustment of the control impedance means to maintain the condition within certain limits, compensating impedance means for also controlling said mechanism in accordance with the adjustment thereof, and means operative as an incident to deviation of the condition to be controlled from the desired normal value for adjusting said compensating impedance means additionally to position the device for returning the value of the condition toward the desired normal value.

5. In combination, an electrically controlled device to be positioned in a plurality of positions for controlling the value of a condition, control impedance means adjusted in accordance with changes in the value of the condition to be controlled and having a desired adjustment corresponding to a desired normal value of the condition, mechanism, including follow-up means operated in response to operation of the device, controlled by the adjustment of the control impedance means for graduatingly positioning the device in accordance with the adjustment of the control impedance means to maintain the condition within certain limits, compensating impedance means for also controlling said mechanism in accordance with the adjustment thereof, and means operative as an incident to deviation of the condition to be controlled from the desired normal value and responsive to the amount of such deviation for adjusting said compensating impedance means at a rate corresponding to the amount of deviation additionally to position the device for returning the value of the condition to be controlled toward the desired normal value.

6. In combination, an electrically controlled device to be positioned in a plurality of positions for controlling the value of a condition, control impedance means adjusted in accordance with changes in the value of the condition to be controlled and having a desired adjustment corresponding to a desired normal value of the condition, mechanism, including follow-up means operated in response to operation of the device, controlled by the adjustment of the control impedance means for graduatingly positioning the device in accordance with the adjustment of the control impedance means to maintain the condition within certain limits, compensating impedance means for also controlling said mechanism in accordance with the adjustment thereof, and means operative as an incident to deviation of the condition to be controlled from the desired normal value and responsive to the duration of time such deviation exists for adjusting said compensating impedance means an amount corresponding to the duration of time the deviation exists additionally to position the device for returning the value of the condition to be controlled toward the desired normal value.

7. In combination, an electrically controlled device to be positioned in a plurality of positions for controlling the value of a condition, control impedance means adjusted in accordance with changes in the value of the condition to be controlled and having a desired adjustment corresponding to a desired normal value of the condition, mechanism, including follow-up means operated in response to operation of the device, controlled by the adjustment of the control impedance means for graduatingly positioning the device in accordance with the adjustment of the control impedance means to maintain the condition within certain limits, compensating impedance means for also controlling said mechanism in accordance with the adjustment thereof, and means operative as an incident to deviation of the condition to be controlled from the desired normal value and responsive to the amount of such deviation and the duration of time such deviation exists for adjusting said compensating impedance means an amount and at a rate corresponding to the amount of deviation and the duration of time the deviation exists for returning the value of the condition toward the desired normal value.

8. In combination with a condition responsive follow-up control system for positioning a device in accordance with changes in the value of the condition to maintain the condition within certain limits, an automatic resetting mechanism for additionally positioning the device to maintain the condition at the desired normal value including, resetting means for additionally positioning the device, a ratchet having a plurality of ratchet teeth for positioning the resetting means, a pawl for engaging the teeth of the ratchet for operating the same, timing means for operating the pawl, and means responsive to the amount of deviation of the condition from the desired normal value for controlling the pawl to prevent the pawl from engaging any teeth when the condition is normal and to cause the pawl to pick up an increasing number of teeth as the condition deviates from the desired normal value.

9. In combination, a device to be positioned in a plurality of positions for controlling the value of a condition, control means the state of which is varied in accordance with changes in the value of the condition to be controlled and having a desired state corresponding to a desired normal value of the condition, means, including follow-up means operated in response to operation of the device, for positioning said device in accordance with the state of the control means to maintain the condition within certain limits, and means responsive to changes in the value of the condition irrespective of the actual value thereof additionally to position the device a predetermined amount immediately upon change in trend of the value of the condition.

10. In combination, a device to be positioned in a plurality of positions for controlling the value of a condition, control means the state of which is varied in accordance with changes in the value of the condition being controlled and having a desired state corresponding to a desired normal value of the condition, means, including follow-up means operated in response to operation of the device, to position the device in accordance with the state of the control means to maintain the condition within certain limits and means controlled by initial reverse changes in said condition regardless of the actual value thereof additionally to position the device upon change in trend of the value of the condition.

11. In combination, an electrically controlled device to be positioned in a plurality of positions for controlling the value of a condition, control impedance means adjusted in accordance with changes in the value of the condition to be controlled and having a desired adjustment corresponding to a desired normal value of the condition, mechanism, including follow-up means operated in response to operation of the device, controlled by the adjustment of the control impedance means for graduatingly positioning the device in accordance with the adjustment of the control impedance means to maintain the condition within certain limits, positioning impedance means for also controlling said mechanism, and means responsive to changes in the value of the condition irrespective of the actual value thereof for controlling the positioning impedance means additionally to position the device immediately upon change in trend of the value of the condition.

12. In combination, a device to be positioned in a plurality of positions for controlling the value of a condition, control means the state of which is varied in accordance with changes in the value of the condition to be controlled and having a desired state corresponding to a desired normal value of the condition, means, including follow-up means operated in response to operation of the device, for positioning said device in accordance with the state of the control means to maintain the condition within certain limits, means operative as an incident to deviation of the condition to be controlled from the desired normal value additionally to position the device with respect to the state of the control means for returning the value of the condition toward the desired normal value, and means responsive to changes in the value of the condition irrespective of the actual value thereof additionally to position the device immediately upon change in trend of the value of the condition.

13. In a control system, the combination of a controller movable through a given range of movement, motor means for performing a function, follow-up means operated by the motor means, means controlled by the controller and the follow-up means for controlling the operation of the motor means to position the motor means in accordance with the position of the controller whereby the motor means is moved through a given range of movement upon movement of the controller through a given range, and means associated with the follow-up means for adjusting the range of movement of the motor means with respect to the range of movement of the controller.

14. In combination, an electrically operated device movable to a plurality of positions within a complete range of movement, control impedance means adjustable through a range of adjustment, balancing impedance means adjustable through a range of adjustment upon substantially complete movement of the device, mechanism controlled by the control impedance means and the balancing impedance means to position the device throughout its range of movement in accordance with the adjustment of the control impedance means throughout its range of adjustment, and other impedance means for also controlling the mechanism to adjust the range of movement of the device with respect to the range of adjustment of the control impedance means.

15. In combination, an electrically operated device movable to a plurality of positions within a complete range of movement, a control potentiometer including a resistance element and a slider relatively adjustable through a range of adjustment, a balancing potentiometer including a resistance element and a slider relatively adjustable through a range of adjustment upon substantially complete movement of the device, relay means including a pair of oppositely acting relay coils for controlling the direction and extent of movement of the electrically controlled device, means including connections between the relay coils and the ends of the resistance elements of the control and balancing potentiometers for controlling the relay means in accordance with the adjustments of the control and balancing potentiometers to position the device throughout its range of movement in accordance with the adjustment of the control potentiometer throughout its range of adjustment, and resistance means operatively associated with said balancing potentiometer for also controlling the relay means to adjust the range of movement of the device with respect to the range of adjustment of the control potentiometer.

16. In combination, an electrically operated device movable to a plurality of positions within a complete range of movement, a control potentiometer including a resistance element and a slider relatively adjustable through a range of adjustment, a balancing potentiometer including a resistance element and a slider relatively adjustable through a range of adjustment upon substantially complete movement of the device, relay means including a pair of relay coils connected in series across a source of power and switching means for controlling the direction and extent of movement of the electrically controlled device depending upon the relative energizations of the relay coils, first connections between the junction of the relay coils and the sliders of the control and balancing potentiometers and second connections between the ends of the resistance elements of the control and balancing potentiometers and the source of power for controlling the relay means in accordance with the adjustments of the control and balancing potentiometers to position the device throughout its range of movement in accordance wtih the adjustment of the control potentiometer throughout its range of adjustment, and resistance means in the first connections for also controlling the relay means to adjust the range of movement of the device with respect to the range of adjustment of the control potentiometer.

17. The method of controlling the magnitude of a condition which comprises adjusting a control element so that its position at all times substantially corresponds to the then existing magnitude of the condition, producing a control effect whose sense is determined by the sense of deviation of said element from its neutral position and whose magnitude is a function of the magnitude of the deviation, producing a second control effect whose sense corresponds with and is derived from the adjustment of said element, and varying the rate of application of an agent affecting the magnitude of said condition in accordance with the resultant of said control effects.

18. The method of controlling the magnitude of a condition which comprises adjusting an element in a sense corresponding to the sense of the rate of change of said condition, deriving from the adjusted element a control effect in accordance with said adjustment, producing a second control effect in accordance with the deviation of said element from its neutral position, producing a third control effect representative of the position of a member controlling the application of an agent affecting the magnitude of said condition, and adjusting the position of said member in accordance with the relative magnitudes of said control effects.

19. The method of controlling the magnitude of a condition which comprises adjusting the position of an element at a rate corresponding to the rate of change of the condition so that its deviation from a neutral position at all times substantially corresponds to the existing departure of the magnitude of the condition from the desired magnitude thereof, producing, so long as there is deviation of said element from its neutral position, a control effect varying as a function of the deviation of said element from neutral position, producing a control effect in accordance with the rate of adjustment of said element, producing a third control effect in accordance with the position of a member controlling the rate of application of an agent controlling the magnitude of said condition, and changing the position of said member in accordance with the relative magnitudes of said control effects.

20. The method of controlling the magnitude of a condition which comprises positioning a control element in accordance with the existing magnitude of the condition, varying the position of a second control element at a rate corresponding to the deviation of said condition from a desired magnitude, and varying the rate of application of an agent controlling the magnitude of said condition in accordance with the relative position of said elements.

21. A control system comprising relatively movable control elements whose relative positions determine the magnitude of a control effect, means for positioning one of said elements in accordance with the magnitude of a condition, means for adjusting another of said control elements at a rate related to departure of the magnitude of said condition from a predetermined magnitude, a member adjustable to vary the rate of application of an agent controlling the magnitude of said condition, means for producing a control effect of magnitude dependent upon the position of said member, and means for adjusting said member in accordance with the resultant of said effects.

22. A system comprising a member deflecting in accordance with the change in magnitude of a condition, an element so adjusted in response to deflections of said member that its position from a neutral position substantially corresponds to the existing deviation of the magnitude of said condition from the desired magnitude, means for varying a control effect by the adjustment of said element, means for varying a control effect at a rate dependent upon the deviation of said member from its neutral position, and control means for varying the application of an agent affecting the magnitude of said condition in accordance with the resultant of said control effects.

23. In combination, a device to be positioned in a plurality of positions for controlling the value of a condition which it is desired to maintain at a given normal value, a system of control for said device including control means the state of which is varied in accordance with changes in the value of said condition and motor means, including follow up means operated thereby, to position said device in accordance with the changes in value of said condition whereby said device has a position corresponding to each value of said condition throughout a predetermined range of change of said condition, means cooperating with said system of control to additionally position said device during at least a portion of the time that the value of said condition is not at said given normal value, and means cooperating with said system of control for changing the amount of change of said condition required to move said device a predetermined amount.

24. An electrical system of graduate control, comprising, in combination, a control mechanism of the type including a switching means operated by an electrical circuit upon unbalancing of the electrical circuit, reversible electric motor means controlled by said switching means, a device for varying the value of a condition which it is desired to maintain at a given value, control means the state of which is varied in accordance with changes in the value of said condition for unbalancing said electrical circuit proportionately to each change in value of said condition whereby said reversible electric motor means is operated, means operated by said reversible electric motor means for rebalancing said electrical circuit whereby the device is positioned in accordance with the variations in said condition to maintain the said condition within a given range but not necessarily at said given value, and manual means for adjusting the unbalancing effects of said control means upon a predetermined change in said condition in respect to the rebalancing effect of said rebalancing means for a given movement of said reversible electric motor means whereby the amount of movement imparted to said device for a given change in the value of said condition may be varied.

25. In combination, a device to be positioned in a plurality of positions for controlling the value of a condition, control means including a member movable back and forth in response to changes in the value of the condition being controlled and having a desired position corresponding to a desired normal value of the condition, means, including a variable resistance bridge and follow-up means operated by said device, to position said device a predetermined amount in a direction to return said condition to the desired value upon a predetermined movement of said movable member to a new position away from said desired position and to position said device a different amount in the opposite direction during the time period comprised by the reaching of said new position by said movable member and its return back to its desired position.

26. In combination, a device to be positioned in a plurality of positions for controlling the value of a condition, control means including a movable member movable back and forth in response to changes in the value of the condition being controlled and having a desired position corresponding to a desired normal value of the condition, a control system for positioning said device in accordance with the movement of said movable member and including a variable resistance bridge which is unbalanced upon movement of said movable member and is rebalanced when said device has been moved to a position corresponding to the movements of the movable member whereby said device is adapted to be returned to the same position each time the movable member returns to its desired position, and means cooperating with said control system and operative to cause said device to assume a position different than it otherwise would upon return of said condition to the desired value.

27. In combination, a device to be positioned in a plurality of positions for controlling the value of a condition, control means including a movable member movable back and forth in response to changes in the value of the condition being controlled and having a desired position corresponding to a desired normal value of the condition, a normally balanced variable resistance bridge, means to unbalance said bridge upon movement of said movable member away from its desired position and to an extent commensurate with the movement of said movable member, means to rebalance said bridge and simultaneously position said device in a direction to return said condition to the desired value and in an amount commensurate to the unbalance of said bridge whereby said device is adapted to be returned to its original position upon return of said movable member to its desired position, and means cooperating with said resistance bridge and operative to further unbalance said bridge at least a portion of the time while said movable member is away from its desired position to cause said device to assume a position upon return of said movable member to its desired position different from that which it was in when the condition originally varied from the desired value.

28. A control system, comprising, in combination, a resistance bridge including a variable controlling resistance, a variable compensating resistance and a variable balancing resistance, means responsive to the value of a condition which it is desired to maintain constant for operating said variable controlling resistance to unbalance said bridge, relay means operated to a first position upon unbalancing of said bridge in one direction and to a second position upon unbalancing of said bridge in the opposite direction, means to vary the value of the condition being controlled, a reversible motor in control thereof and controlled by said relay means in a manner to return said condition to the desired value, means to simultaneously operate said variable balancing resistance to restore the balance of said bridge, and means to intermittently adjust said variable compensating resistance in a manner to further unbalance said resistance bridge whenever the value of said condition varies from the desired value to cause additional operation of said reversible motor means in a manner to return said condition to the desired value.

29. In combination, a device to be positioned in a plurality of positions for controlling the value of a condition which it is desired to maintain at a given normal value, a system of control for said device including control means the state of which is varied in accordance with changes in the value of said condition, motor means, including follow-up means operated thereby to position said device in accordance with the changes in value of said condition whereby said device has a position corresponding to each value of said condition throughout a predetermined range of change of said condition, means cooperating with said system of control to additionally position said device during at least a portion of the time that the value of said condition is not at said given normal value, and means to continuously indicate the summation of the additional movements imparted to said device by said last named means.

30. In combination, a device to be positioned in a plurality of positions for controlling the value of a condition which it is desired to maintain at a given normal value, an electric system of control for said device including control means the state of which is varied in accordance with changes in the value of said condition, electric motor means, including follow-up means operated thereby to position said device in accordance with the changes in value of said condition whereby said device has a position corresponding to each value of said condition throughout a predetermined range of change of said condition, means cooperating with said motor means to additionally position said device during at least a portion of the time that the value of said condition is not at said given normal value, and means to manually adjust the amount of additional movement imparted to said device by said last-named means.

31. An electrical system of graduate control, comprising, in combination, a controlling mechanism of the type including a switching means operated by an electrical circuit upon unbalancing of the electrical circuit, reversible electric motor means controlled by said switching means, a device for varying the value of a condition which it is desired to maintain at a given value, control means the state of which is varied in accordance with changes in the value of said condition for unbalancing said electrical circuit proportionately to each change in value of said condition whereby said reversible electric motor means is operated, means operated by said reversible electric motor means for rebalancing said electrical circuit whereby the device is positioned in accordance with the variations in said condition to maintain the said condition within a predetermined range of change but not necessarily at said given value, and means cooperating with said electrical circuit and operative at least a portion of the time while said condition is at a value other than the desired value to unbalance said electrical circuit in a manner to cause said device to assume a position upon return of the condition to the desired value different from the position in which it was when the condition originally varied from the desired value, said difference in positions of said device depending upon the extent to which the condition varied from the desired value.

32. In combination, a device to be positioned in a plurality of positions for controlling the value of a condition, control means including a movable member movable back and forth in response to changes in the value of the condition being controlled and having a desired position corresponding to a desired normal value of the condition, a normally balanced variable resistance bridge, means to unbalance said bridge upon movement of said movable member away from its desired position and to an extent commensurate with the movement of said movable member, means to rebalance said bridge and simultaneously position said device in a direction to return said condition to the desired value and in an amount commensurate to the unbalance of said bridge whereby said device is adapted to be returned to its original position upon return of said movable member to its desired position, and means cooperating with said rebalancing means and operative at least a portion of the time while said movable member is away from its desired position to cause said device to assume a position upon return of said movable member to its desired position different from that which it was in when the condition originally varied from the desired value, said difference in positions of said device depending upon the extent to which the condition varied from the desired value.

33. A control system, comprising in combination, a resistance bridge including a variable controlling resistance, a variable compensating resistance and a variable balancing resistance, means responsive to the value of a condition which it is desired to maintain constant for operating said variable controlling resistance to unbalance said bridge, relay means operated to a first position upon unbalancing of said bridge in one direction and to a second position upon unbalancing of said bridge in the opposite direction, means to vary the value of the condition being controlled, a reversible motor in control thereof and controlled by said relay means in a manner to return said condition to the desired value, means to simultaneously operate said variable balancing resistance to restore the balance of said bridge, and means to adjust said variable compensating resistance in a manner to further unbalance said resistance bridge an amount dependent upon the length of time the value of said condition varies from the desired value whenever the value of said condition varies from the desired value to cause additional operation of said reversible motor means in a manner to return said condition to the desired value.

34. The method of controlling the magnitude of a condition which comprises adjusting a control element so that its position at all times substantially corresponds to the then existing magnitude of the condition, producing a control effect whose sense is determined by the sense of deviation of said element from its neutral position and whose magnitude is a function of the magnitude of the deviation and the length of time such deviation persists, producing a second control effect whose sense corresponds with and is derived from the adjustment of said element, and varying the rate of application of an agent affecting the magnitude of said condition in accordance with the resultant of said control effects.

35. An electrical system of graduate control, comprising, in combination, a controlling mechanism of the type including a switching means operated by an electrical circuit upon unbalancing of the electrical circuit, reversible electric motor means controlled by said switching means, a device for varying the value of a condition which it is desired to maintain at a given value, control means the state of which is varied in accordance with changes in the value of said condition for unbalancing said electrical circuit proportionately to each change in value of said condition whereby said reversible electric motor means is operated, means operated by said reversible electric motor means for rebalancing said electrical circuit whereby the device is positioned in accordance with the variations in said condition to maintain the said condition within a predetermined range of change but not necessarily at said given value, means for additionally unbalancing said electrical circuit upon departure of the value of said condition from said given value and in an amount dependent upon the amount of said departure and the length of time said departure persists whereby said device is additionally operated by said reversible electric motor means as the latter operates said rebalancing means to rebalance said electrical circuit.

36. In combination, a device to be positioned in a plurality of positions for controlling the value of a condition, control means the state of which is varied in accordance with changes in the value of the condition to be controlled and having a desired state corresponding to a desired normal value of the condition, means, including follow-up means operated in response to operation of the device, for positioning said device in accordance with the state of the control means to maintain the condition within certain limits, means responsive to changes in the value of the condition irrespective of the actual value thereof additionally to position the device in a direction to reverse the trend in the change of said condition immediately upon change in trend of the value of the condition, and means operated as an incident to deviation of the condition from the desired value and responsive to the amount of such deviation additionally to position the device at a rate corresponding to the amount of such deviation for returning the value of the condition to be controlled toward the desired normal value.

37. In combination, a device to be positioned in a plurality of positions for controlling the value of a condition, control means the state of which is varied in accordance with changes in the value of the condition to be controlled and having a desired state corresponding to a desired normal value of the condition, means, including follow-up means operated in response to operation of the device, for positioning said device in accordance with the state of the control means to maintain the condition within certain limits, means responsive to changes in the value of the condition irrespective of the actual value thereof additionally to position the device in a direction to reverse the trend in the change of said condition immediately upon change in trend of the value of the condition, and means operated as an incident to deviation of the condition from the desired value and responsive to the duration of time such deviation exists additionally to position the device an amount corresponding to the duration of time the deviation exists for returning the condition to be controlled toward the desired normal value.

38. An electrical system of graduate control, comprising, in combination, a controlling mechanism of the type including a switching means operated by an electrical circuit upon unbalancing of the electrical circuit, reversible electric motor means controlled by said switching means to rotate in opposite directions upon unbalance in said circuit in opposite directions, a device for varying the value of a condition which it is desired to maintain at a given value, control means the state of which is varied in accordance with changes in the value of said condition for unbalancing said electrical circuit proportionately to each change in value of said condition whereby said reversible electric motor means is operated, means operated by said reversible electric motor means for rebalancing said electrical circuit whereby the device is positioned in accordance with the variations in said condition to maintain the said condition within a predetermined range of change but not necessarily at said given value, and means operated as an incident to changes in the value of said condition irrespective of the actual value thereof and immediately upon change in trend of the value of said condition to additionally unbalance said electrical circuit in a manner requiring movement of said device and operation of said rebalancing means in a direction to reverse the trend in the change of said condition.

LEWIS L. CUNNINGHAM.